US012562816B2

(12) United States Patent
Wang et al.

(10) Patent No.: US 12,562,816 B2
(45) Date of Patent: Feb. 24, 2026

(54) OPTICAL TRANSCEIVER WITH MULTIMODE INTERFEROMETERS

(71) Applicant: Marvell Asia Pte Ltd, Singapore (SG)

(72) Inventors: Yun Wang, Ottawa (CA); Hong Cai, San Jose, CA (US); Nathan Lin, San Jose, CA (US); Jie Lin, Santa Clara, CA (US)

(73) Assignee: Marvell Asia Pte Ltd, Singapore (SG)

( * ) Notice: Subject to any disclaimer, the term of this patent is extended or adjusted under 35 U.S.C. 154(b) by 283 days.

(21) Appl. No.: 18/353,084

(22) Filed: Jul. 16, 2023

(65) Prior Publication Data

US 2024/0022329 A1 Jan. 18, 2024

Related U.S. Application Data

(60) Provisional application No. 63/390,017, filed on Jul. 18, 2022.

(51) Int. Cl.
| | |
|---|---|
| *H04B 10/40* | (2013.01) |
| *G02B 6/293* | (2006.01) |
| *H04B 10/11* | (2013.01) |

(52) U.S. Cl.
CPC ......... *H04B 10/40* (2013.01); *G02B 6/29344* (2013.01); *H04B 10/11* (2013.01)

(58) Field of Classification Search
CPC ..... H04B 10/11; H04B 10/40; G02B 6/29344
USPC ........................................................ 398/128
See application file for complete search history.

(56) References Cited

U.S. PATENT DOCUMENTS

| | | | |
|---|---|---|---|
| 10,754,091 B1* | 8/2020 | Nagarajan | G02B 6/4246 |
| 2016/0357086 A1* | 12/2016 | Jewart | G02B 6/125 |
| 2019/0033529 A1* | 1/2019 | Horth | G02B 6/2813 |
| 2019/0285815 A1* | 9/2019 | Sugiyama | G02B 6/125 |

FOREIGN PATENT DOCUMENTS

JP        2020154038 A        9/2020

OTHER PUBLICATIONS

EP Application # 23186039.6 Search Report dated Nov. 23, 2023.
(Continued)

*Primary Examiner* — Dalzid E Singh
(74) *Attorney, Agent, or Firm* — Meitar Patents Ltd.; Daniel Kligler

(57) ABSTRACT

An optical transceiver includes optical circuitry disposed on a substrate and comprising a transmitter and a receiver. The circuitry includes least one multi-mode interferometer (MMI), including a multi-mode waveguide comprising an input face and an output face, the input and output faces being bisected by a longitudinal axis, the multi-mode waveguide having a predefined width transverse to the longitudinal axis. Ports are coupled to respective waveguides and are configured to launch one or more input beams through the input face and receive one or more output beams from the output face. The ports include, on at least one of the faces, two or more ports at respective locations that are offset transversely from the longitudinal axis by at least $\lambda_0/300$ from respective base transverse displacements that are equal to integer fractions of the width.

20 Claims, 5 Drawing Sheets

(56) References Cited

OTHER PUBLICATIONS

Sheng et al., "A compact and low-loss MMI coupler fabricated with CMOS technology," IEEE Photonics Journal, vol. 4, No. 6, pp. 2272-2277, Dec. 2012.

Rottmann et al., "Integrated-optic wavelength multiplexers on lithium niobate based on two-mode interference," Journal of Lightwave Technology, vol. 6, No. 6, pp. 946-952, Jun. 1988.

Dumais et al., "2×2 multimode interference coupler with low loss using 248 nm photolithography," Optical Fiber Communication Conference, Optical Society of America, pp. 1-3, Mar. 2016.

Hill et al., "Optimizing imbalance and loss in 2×2 3-dB multimode interference couplers via access waveguide width," Journal of Lightwave Technology, vol. 21, No. 10, pp. 2305-2313, Oct. 2003.

Xu et al., "Ultra-broadband and ultra-compact optical 90° hybrid based on 2×4 MMI coupler with subwavelength gratings on silicon-on-insulator," Optical Fiber Communication Conference. Optical Society of America, pp. 1-3, Mar. 2018.

Voigt et al., "C-Band Optical 90° Hybrids in Silicon Nanowaveguide Technology," IEEE Photonics Technology etters, vol. 23, No. 23, pp. 1769-1771, Dec. 2011.

Fandino et al., "Manufacturing tolerance analysis of an InP, 4×4 MMI-based 90° optical hybrid for integrated coherent receivers," Optical Fiber Communication Conference, Optical Society of America, pp. 1-3, Mar. 2013.

Zhang et al., "Full bandwidth wavelength division multiplexer/demultiplexer based on MMI," IEEE Photonics Technology Letters, vol. 30, No. 1, pp. 107-110, Jan. 2018.

Yang et al., "Ultrashort polarization splitter using two-mode interference in silicon photonic wires," IEEE Photonics Technology Letters, vol. 21, No. 7, pp. 432-434, Apr. 2009.

Yin et al., "CMOS-compatible and fabrication-tolerant MMI-based polarization beam splitter," Elsevier B.V., Optics Communications, vol. 335, pp. 48-52, year 2014.

Soldano et al., "Optical multi-mode interference devices based on self-imaging: principles and applications," Journal of Lightwave Technology, vol. 13, No. 4, pp. 615-627, Apr. 1995.

Jeong et al., "Novel Optical 90° Hybrid Consisting of a Paired Interference Based 2×4 MMI Coupler, a Phase Shifter and a 2×2 MMI Coupler," Journal of Lightwave Technology, vol. 28 No. 9, pp. 1323-1331, year 2010.

Yang et al., "Ultra-compact optical 90° hybrid based on a wedge-shaped 2×4 MMI coupler and a 2×2 MMI coupler in silicon-on-insulator," Optics Express, vol. 21, No. 23, pp. 28423-28431, year 2013.

Guan et al., "Compact and low loss 90° optical hybrid on a silicon-on-insulator platform," Optics Express, vol. 25 No. 23, pp. 28957-28968, Nov. 2017.

* cited by examiner

OPTICAL TRANSCEIVER WITH MULTIMODE INTERFEROMETERS

CROSS-REFERENCE TO RELATED APPLICATION

This application claims the benefit of U.S. Provisional Patent Application 63/390,017, filed Jul. 18, 2022, which is incorporated herein by reference.

FIELD OF THE INVENTION

The present invention relates generally to optical communication devices, and particularly to multimode interferometers.

BACKGROUND

Optical communication comprises, in its broadest sense, communication at a distance using light to carry information. Modern optical communication systems are based on the use of optical fibers to carry guided wave optical beams that are modulated to convey information. These systems employ transceivers, generally formed as photonic integrated circuits (PICs), to transmit and receive the modulated optical beams.

SUMMARY

Embodiments of the present invention that are described hereinbelow provide improved designs of and fabrication methods for multimode interferometers used in optical communications devices.

There is therefore provided, in accordance with an embodiment of the invention, an optical transceiver, including a substrate and optical circuitry disposed on the substrate. The optical circuitry includes a transmitter, including first waveguides and one or more modulators configured to generate an outgoing modulated optical beam at a free-space wavelength Xo for transmission over an optical communication link. A receiver includes second waveguides and one or more detectors configured to receive and sense an incoming modulated optical beam at the free-space wavelength Xo from the optical communication link. At least one multimode interferometer (MMI) includes a multi-mode waveguide including an input face and an output face, the input and output faces being bisected by a longitudinal axis, the multi-mode waveguide having a predefined width transverse to the longitudinal axis. Ports are coupled to respective ones of the waveguides and are configured to launch one or more input beams through the input face and receive one or more output beams from the output face. The ports include, on at least one of the faces, two or more ports at respective locations that are offset transversely from the longitudinal axis by at least $\lambda_o/300$ from respective base transverse displacements that are equal to integer fractions of the width.

In a disclosed embodiment, the substrate is formed of silicon (Si) or silicon-on-insulator (SOI). Additionally or alternatively, the first and second waveguides are formed of Si or silicon nitride (SiN).

In one embodiment, the two or more ports consist of two ports, wherein the base displacements relative to the longitudinal axis are $\pm\frac{1}{4}$ of the width. In another embodiment, the two or more ports consist of four ports, wherein the base displacements relative to the longitudinal axis are $\pm\frac{1}{8}$ and $\pm\frac{3}{8}$ of the width.

Typically, the two or more ports are offset away from the longitudinal axis relative to the base displacements that are equal to integer fractions of the width.

In some embodiments, the two or more ports are offset from the base displacements by at least $\lambda_o/100$. Additionally or alternatively, the two or more ports are offset from the base displacements by at least 5 nm or even by at least 10 nm.

In one embodiment, the two or more ports include at least two input ports, which are offset transversely by at least $\lambda_o/300$ from the respective base displacements on the input face, and at least two output ports, which are offset transversely by at least $\lambda_o/300$ from the respective base displacements on the output face.

There is also provided, in accordance with an embodiment of the invention, a method for optical communication, which includes providing optical circuitry disposed on a substrate and including a transmitter, including first waveguides and one or more modulators configured to generate an outgoing modulated optical beam at a free-space wavelength Xo for transmission over an optical communication link, and a receiver, including second waveguides and one or more detectors configured to receive and sense an incoming modulated optical beam at the free-space wavelength Xo from the optical communication link. At least one multimode interferometer (MMI) is incorporated in the optical circuitry. The at least one MMI includes a multi-mode waveguide including an input face and an output face, the input and output faces being bisected by a longitudinal axis, the multi-mode waveguide having a predefined width transverse to the longitudinal axis. The at least one MMI includes ports, which are coupled to respective ones of the waveguides and are configured to launch one or more input beams through the input face and receive one or more output beams from the output face, including two or more ports on at least one of the faces. Respective locations of the two or more ports are offset transversely from the longitudinal axis by at least $\lambda_o/300$ from respective base transverse displacements that are equal to integer fractions of the width.

The present invention will be more fully understood from the following detailed description of the embodiments thereof, taken together with the drawings in which:

DETAILED DESCRIPTION OF EMBODIMENTS

Introduction

Figure 1:
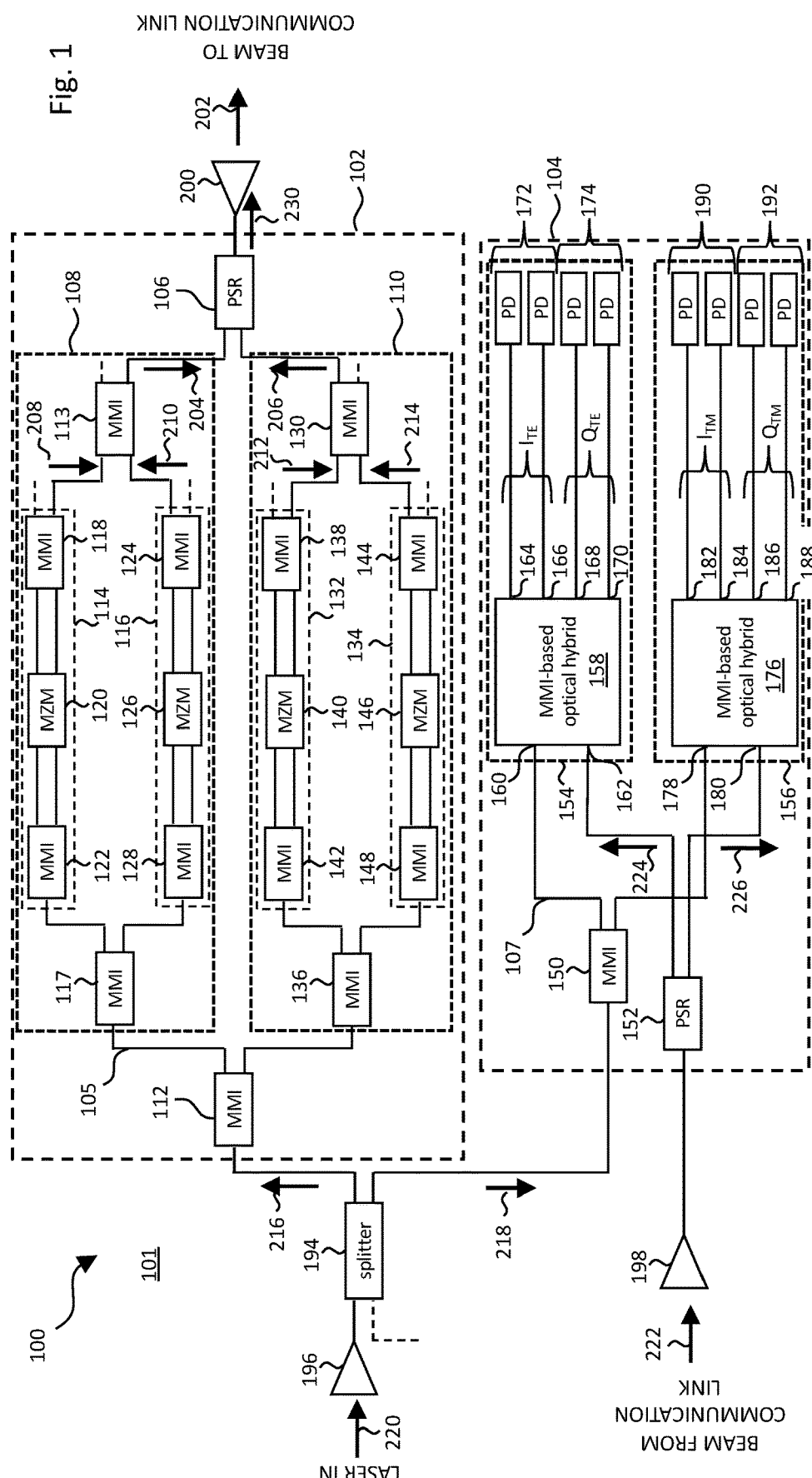
FIG. 1 is a block diagram that schematically illustrates a coherent optical transceiver, in accordance with an embodiment of the invention.

A transceiver in an optical communication system commonly employs multimode interferometers (MMIs) as building blocks for modulators and demodulators of optical beams. The central structure of an MMI is a multimode waveguide typically designed to support a large number ($\geq 3$) of propagating modes. The multimode waveguide comprises an input face with one or more input waveguides attached to input ports on the input face for launching beams of optical radiation into the multimode waveguide. The multimode waveguide further comprises an output face with one or more output waveguides attached to output ports on the output face for extracting beams of optical radiation from the multimode waveguide. (The input and output waveguides are typically, but not necessarily, single-mode waveguides.) An MMI is usually referred to as an n×m MMI, wherein n refers to the number of input ports, and m refers to the number of output ports.

The MMI converts the beams launched into the multimode waveguide through the input ports into beams emitted through the output ports according to the so-called "self-imaging principle". The self-imaging principle refers to the property of multimode waveguides that a profile of the optical field in the waveguide is reproduced in single or multiple images at periodic intervals along the propagation direction of the waveguide. In the present description, the field profile is generated by the beams entering the waveguide through the input ports, and the beams emitted through the output ports are generated from single or multiple images of the field as sampled by the output ports.

In a modal analysis of the MMI, the field of optical radiation propagating in the multimode waveguide is described in terms of propagating modes. The mechanism of self-imaging in the multimode waveguide may be divided into two categories: "general interference" refers to self-imaging that is independent of the modal excitation, whereas "restricted interference" refers to self-imaging obtained by exciting only certain modes.

MMIs may be configured in various different ways, for example as power splitters or combiners, wavelength multiplexers or demultiplexers, or polarization beamsplitters. When the output phases of a 2×2 or 4×4 MMI satisfy a phase quadrature relationship, the MMI may be used as a 90° optical hybrid, for example for measuring the real and imaginary parts of a modulated optical beam in a coherent receiver. A 90° optical hybrid may also be constructed by cascading a 2×4 MMI with a 2×2 MMI, separated by a phase-modulated waveguide. A similar 90° optical hybrid may further be constructed by cascading a 1×2 MMI with a 2×2 MMI.

Two important figures of merit for an MMI are its insertion loss (IL) and its output power imbalance, commonly denoted by a common-mode rejection ratio (CMRR). The insertion loss IL is defined as $$IL = 10 \log_{10} \frac{\sum P_{out}}{\sum P_{in}},$$

wherein $\sum P_{in}$ denotes the sum of all input beam powers to the MMI, and $\sum P_{out}$ denotes the sum of all output beam powers. The common-mode rejection ratio CMRR is defined between two output beams with powers $P_1$ and $P_2$ as $$CMRR = 20 \log_{10} \frac{|P_1 - P_2|}{P_1 + P_2}.$$

In commonly used designs of MMIs, the transverse displacements of the input and output ports relative to the longitudinal axis bisecting the MMI are equal to integer fractions of the physical width of the MMI. These displacements are referred to in the present description as "base displacements." For example, in a general-interference 2×2 MMI with a physical width of W, the input and output ports are displaced by distances ±W/4 from the axis. In a restricted interference 2×2 MMI, the input and output ports are displaced by distances ±W/6 from the axis. Similarly, for a general-interference 4×4 MMI, the input and output ports are displaced by distances ±W/8 and ±3 W/8 from the axis.

Such MMI designs typically have low IL but may suffer from high CMRR, resulting in unbalanced output powers. When the MMI is incorporated in a device, such as an optical transceiver, the imbalance of output powers can have a negative impact on the performance of the device and may require costly rebalancing of the powers downstream.

Embodiments of the present invention that are described herein provide MMIs with reduced CMRR by displacing the input and/or output ports transversely relative to the longitudinal axis of the MMI by a small offset δ from the base displacements. For an optical transceiver operating at a free-space wavelength of $\lambda_0$, for example, the offset δ is at least $\lambda_0/300$ and may be greater than $\lambda_0/100$, for reasons that are explained below. In absolute terms, the offset δ is at least 5 nm and may be greater than 10 nm.

This offset δ reflects the impact of the Goos-Hänchen effect and the attendant Goos-Hänchen displacement. The Goos-Hänchen effect is an optical phenomenon in which linearly polarized light undergoes a small displacement when totally internally reflected. The displacement is transverse to the direction of propagation, within the plane containing the incident and reflected beams. For an MMI, the transverse displacement may be interpreted as a penetration of the totally internally reflected light by a small distance into the low-index medium surrounding the MMI. This small distance may, in turn, be interpreted as contributing to an increased effective width $W_{ev}$ of the MMI, wherein $W_{ev} > W$.

Although the Goos-Hänchen displacement is specific to the mode number and polarization of each guided-wave mode propagating in the MMI, $W_{ev}$ may generally be approximated by the effective width corresponding to the fundamental ($0^{th}$ order) guided-wave mode. Taking further into account that PICs utilizing MMIs in practice operate with TE-polarized light, the difference between $W_{ev}$ and W, δW may be calculated as $$\delta W = (\lambda_0/\pi)(n_r^2 - n_c^2)^{-1/2} \qquad \text{Eqn. [1]}$$

wherein $n_r$ is the refractive index of the waveguiding material of the MMI, and $n_c$ is the refractive index of the cladding material surrounding the MMI. $\lambda_0$ refers to the free-space wavelength of the guided-wave radiation.

Taking into account the Goos-Hänchen displacement, in some embodiments of the present invention the transverse displacements of the input and output ports relative to the longitudinal center axis of the MMI are computed based on the effective width $W_{ev}$, rather than the physical width W of the MMI. For example, for a general-interference 2×2 MMI, the offset δ from the base displacement can be computed as $$\delta = \frac{1}{4}(\lambda_0/\pi)(n_r^2 - n_c^2)^{-1/2}. \qquad \text{Eqn. [2]}$$

Using the refractive indices for an MMI on a substrate comprising silicon-on-insulator (SOI), and a free-space wavelength $\lambda_0$ in the near infrared range, δ is on the order of a few tens of nanometers. For example, for a silicon nitride (SiN) waveguide with a silicon dioxide ($SiO_2$) cladding and for radiation with a free-space wavelength of 1550 nm, the computed value of the offset $\delta$ is 40.0 nm. As the offset $\delta$ is linear in the free-space wavelength $\lambda_O$ (ignoring the dispersion of the refractive indices), it may also be expressed in this example as $\lambda_O/39$.

Such a small $\delta$ has a negligible impact on IL, but it has a significant impact on CMRR, as illustrated by the plots presented hereinbelow. In addition, $\delta$ has a significant impact on the phase of the radiation emitted through the output ports the MMI, which improves the performance of phase-sensitive designs, such as optical hybrids. The approximate value of the offset $\delta$ that is given in Eqn. 2 hereinabove may be optimized to achieve further improvement in the CMRR, for example using commercially available electromagnetic simulation software, such as Ansys Lumerical Mode or other simulation software based on the finite-difference time-domain (FDTD) method.

MMIs in accordance with embodiments of the invention are particularly useful, inter alia, in improving the performance of optical transceivers. Thus, some embodiments provide an optical transceiver, comprising a substrate and optical circuitry disposed on the substrate. The optical circuitry comprises a transmitter, comprising first waveguides and one or more modulators configured to generate an outgoing modulated optical beam for transmission over an optical communication link. The optical circuitry further comprises a receiver, comprising second waveguides and one or more detectors configured to receive and sense an incoming modulated optical beam from the optical communication link. The transmitter and receiver are configured to operate at a certain free-space wavelength, $\lambda_O$.

The optical circuitry comprises at least one MMI, which comprises a multi-mode waveguide having an input face and an output face. The input and output faces are bisected by a longitudinal axis. The multi-mode waveguide has a certain width in the direction transverse to the longitudinal axis. The MMI further comprises ports, which are coupled respectively to launch one or more input beams into the input face and to receive one or more output beams from the output face, including two or more ports on at least one of the faces of the multi-mode waveguide, i.e., two or more input ports and/or two or more output ports.

In embodiments described in the present disclosure, the locations of these two or more input ports or output ports (or both) are offset transversely relative to the longitudinal axis by an offset $\delta$ that is at least $\lambda_O/300$ from a base displacement that is equal to an integer fraction of the width. For example, the base displacements of a pair of input ports or output ports in a general-interference 2×2 MMI will be ±W/4 from the longitudinal axis; whereas the base displacements of four input ports or output ports in a general-interference 4×4 MMI will be ±W/8 and ±3 W/8 from the longitudinal axis. Other base displacements are also possible in other MMI configurations, for example ±W/6 in a restricted-interference 2×2 MMI. The ports are typically offset away from the longitudinal axis relative to these base displacements. In some embodiments, $\delta \geq \lambda_O/100$. Alternatively, it may be stated that $\delta \geq 5$ nm or even $\delta \geq 10$ nm.

System Description

FIG. 1 is a block diagram that schematically illustrates a coherent optical transceiver 100, in accordance with an embodiment of the invention. Transceiver 100 is formed as a PIC on a substrate 101, such as SOI or silicon (Si), with its various active and passive components connected by optical waveguides 105, 107 comprising for example Si or SiN. Transceiver 100 comprises a transmitter 102 for generating and sending a modulated optical beam over an optical communication link and a receiver 104 for receiving and sensing an incoming modulated beam from the link. Transmitter 102 and receiver 104 use multiple MMIs, as described below, which have port offsets in accordance with the principles of the present invention. Alternatively, such MMIs may be used in transceivers of other types, as well as other sorts of integrated photonic devices.

Transmitter 102 in this example comprises a polarization splitter rotator (PSR) 106, modulators in the form of a TE-modulation branch 108 and a TM-modulation branch 110, and a 1×2 MMI splitter 112, all interconnected by waveguides 105. (Both branches 108 and 110 operate in TE-mode. The terms "TE-modulation" and "TM-modulation" are used to indicate the intended polarization of the modulated signal of each branch at the exit to the communication link. This will be further detailed hereinbelow.) TE-modulation branch 108 comprises an MMI combiner 113, an upper TE branch 114, a lower TE branch 116, and a 1×2 MMI splitter 117. (The terms "upper" and "lower" are used herein for convenience to correspond to the positions of the branches in FIG. 1, without relation to the physical positions of the components in transceiver 100.) Upper TE branch 114 comprises a 2×2 MMI combiner 118, a Mach-Zehnder modulator (MZM) 120, and 1×2 MMI splitter 122. MZM 120 comprises two internal waveguides, wherein the optical path in one or both waveguides may be modulated. Thus, MZM 120 together with MMIs 118 and 122 forms a Mach-Zehnder interferometer, whose output amplitude and phase may be modulated. (The other MZMs in transmitter 102, together with the MMIs flanking them, similarly form Mach-Zehnder interferometers.) Lower TE branch 116 comprises, similarly to upper branch 114, a 2×2 MMI combiner 124, an MZM 126, and a 1×2 MMI splitter 128.

TM-modulation branch 110 comprises, similarly to TE-modulation branch 108, an MMI combiner 130, an upper TM branch 132, a lower TM branch 134, and a 1×2 MMI splitter 136. Upper TM branch 132 comprises a 2×2 MMI combiner 138, an MZM 140, and 2×1 MMI combiner 142, and lower TM branch 134 comprises a 2×2 MMI combiner 144, an MZM 146, and 1×2 MMI splitter 148.

Receiver 104 comprises a 1×2 MMI splitter 150, a PSR 152, and detectors in the form of a TE-sensor 154 and a TM-sensor 156, all interconnected by waveguides 107. (Similarly to TE-branch 108 and TM-branch 110 hereinabove, both sensors 154 and 156 operate in TE-mode. The terms "TE-sensor" and "TM-sensor" are used to indicate the polarization of the respective signals as received from the communication link.) TE-sensor 154 comprises an MMI-based optical hybrid 158, comprising two input ports 160 and 162 and four output ports 164, 166, 168, and 170. TE-sensor 154 further comprises two balanced pairs of photodiodes (PD) 172 and 174, wherein the photodiodes of pair 172 are coupled to output ports 164 and 166, and the photodiodes of pair 174 are coupled to output ports 168 and 170.

TM-sensor 156 comprises an MMI-based optical hybrid 176, comprising two input ports 178 and 180 and four output ports 182, 184, 186, and 188. TM-sensor 156 further comprises two balanced pairs of photodiodes (PD) 190 and 192, wherein the photodiodes of pair 190 are coupled to output ports 182 and 184, and the photodiodes of pair 192 are coupled to output ports 186 and 188.

Transceiver 100 further comprises a splitter 194 and input/output couplers 196, 198, and 200 through which the transceiver receives and transmits beams of optical radiation. Coupler 196 receives a beam from a local laser. Coupler 198 receives a modulated optical beam from a communication link, and coupler 202 transmits a modulated beam into an optical communication link, as will be detailed hereinbelow.

For transmitting a modulated beam to the communication link, transmitter 102 receives from a laser source (not shown in the figure) an unmodulated TE-polarized beam of optical radiation. The beam, shown schematically as an arrow 220, arrives in coupler 196 either through an optical waveguide or by propagating in free space. Splitter 194 splits the beam into two beams to be utilized both by transmitter 102 and by receiver 104, with the beams shown schematically as arrows 216 and 218. Beam 216 propagates in waveguide 105 to MMI 112 in transmitter 102, while beam 218 propagates as a local oscillator (LO) beam in waveguide 107 to MMI 150 in receiver 104. MMI 112 splits beam 216 to MMIs 117 and 136 in the two branches 108 and 110, respectively.

In TE-branch 108 the guided beam is split to upper and lower TE-branches 114 and 116, respectively, by MMI splitter 117. MMI splitter 122 splits the guided beam in upper TE-branch 114 into two guided beams, which are received by MZM 120. Driven by an external controller (not shown in the figure), MZM 120 imposes an optical phase difference between the two received guided beams. The two guided beams are transmitted to MMI combiner 118, which adds the two beams to a single guided wave shown schematically by an arrow 208. Due to the phase difference between the two combined beams, the intensity (and alternatively also the phase) of the beam shown by arrow 208 is modulated, thus forming a modulated beam. In a similar fashion, lower TE-branch 116 produces another modulated beam, schematically shown by an arrow 210. Further similarly, upper TM-branch 132 and lower TM-branch 134 produce modulated beams schematically shown by respective arrows 212 and 214.

Beams 208, 210, 212, and 214 are combined pair-wise by MMI combiners 113 and 130 to respective guided beams 204 and 206, which are propagated to PSR 106. PSR 106 transmits beam 204 from TE-modulator 108 as a TE-polarized beam, while it rotates beam 206 from TM-modulator 110 to a TM-polarized beam. Thus PSR 106 outputs a single composite beam with both TE- and TM-polarizations, shown schematically by an arrow 230. Beam 230 is conveyed to coupler 200, which couples the modulated composite beam to the communication link, as shown schematically by an arrow 202.

For analyzing a composite (TE- and TM-polarized) input beam from the communication link, the beam, shown schematically by an arrow 222, is received through coupler 198 and is conveyed to PSR 152 in receiver 104. PSR 152 passes the TE-polarized component of beam 222 to TE-sensor 154 as a beam 224, and rotates the TM-polarized components of beam 222 into a TE-polarized beam 226, passing it to TM-sensor 156. Beams 224 and 226 are conveyed by waveguide 107 to respective inputs 162 and 180 of optical hybrids 158 and 176. LO beam 218 is split by MMI 150 to respective inputs 160 and 178 of optical hybrids 158 and 176.

Using the input beam received in input 160 and the LO beam received in input 162, optical hybrid 158 extracts from the input beam the $I_{TE}$- and $Q_{TE}$-components of the TE-polarized component of the input beam, wherein I refers to the in-phase beam (as referenced to the LO beam) and Q refers to the quadrature (90° out-of-phase) beam. The $I_{TE}$-beam is output from ports 164 and 166 into balanced pair 172, and the $Q_{TE}$-beam is output from ports 168 and 170 into balanced pair 174. The PDs of balanced pairs 172 and 174 output electrical signals responsively to the received beams, which are received by an external controller (not shown in the figure), which in turn extracts the amplitude and phase of the TE-polarized component of the input beam. In a similar way, TM-sensor 156 extracts the $I_{TM}$- and $Q_{TM}$- beams of the TM-polarized component of the input beam, and electrical signals from balanced pairs 190 and 192 are utilized by the external controller to extract the amplitude and phase of the TM-polarized component of the input beam.

Multi-Mode Interferometers

Figures 2A, 2B:
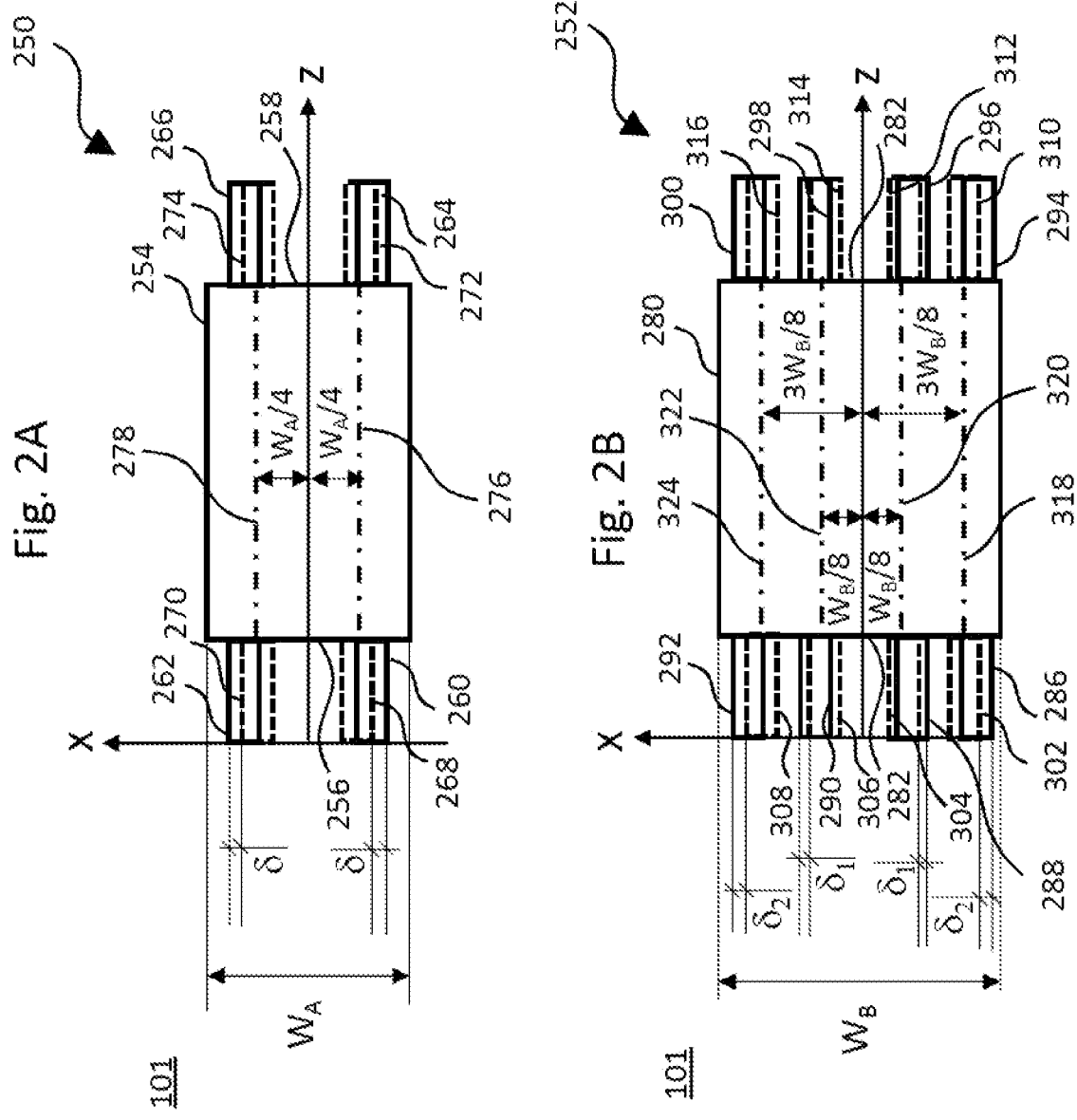
FIGS. 2A and 2B are schematic top views of multimode interferometers (MMIs), which may be used in the transceiver of FIG. 1, in accordance with embodiments of the invention.

FIGS. 2A and 2B are respective schematic top views of a general-interference 2×2 MMI 250 and a general-interference 4×4 MMI 252, respectively, in accordance with embodiments of the invention. MMI 250 and MMI 252 can be used, for example, to perform the functions of certain MMIs in transceiver 100 (FIG. 1). Alternatively, these MMIs and other MMIs in accordance with embodiments of the invention can be used in a wide range of other integrated optoelectronic applications.

With reference to the x- and z-coordinate axes, MMI 250 (FIG. 2A) is formed on substrate 101 in the xz-plane, with guided waves propagating in the z-direction. MMI 250 comprises a multimode waveguide 254, which is bisected by the z-axis (forming its longitudinal axis), and has a width $W_A$ in the x-direction (transverse to the z-axis). MMI 250 further has an input face 256 and an output face 258, with two input ports 260 and 262 on the input face and two output ports 264 and 266 on the output face. Ports 260, 262, 264, and 266 have been offset for optimal CMRR for MMI 250, as described hereinabove and as detailed further hereinbelow.

For a comparison to a general-interference 2×2 MMI with commonly used base displacements of $\pm W_A/4$ (i.e., not optimized for improved CMMR), input ports 268 and 270 and output ports 272 and 274 of such an MMI are drawn at the respective base displacements in the present figure using dotted lines. Lines 276 and 278 define respective centerlines for the pair of ports 268 and 272 and for the pair of ports 270 and 274, respectively, showing the $\pm W_A/4$ base displacements from the z-axis, wherein the signs of the displacements refer to the direction of the x-axis.

The displacements of input ports 260 and 262 and output ports 264 and 266 are shown referenced to the base displacements of input ports 268 and 270 and output ports 272 and 274. Input port 260 and output port 264 are displaced transversely outward by an offset $-\delta$ from respective ports 268 and 272 with base displacements of $-W/4$, and input port 262 and output port 266 are displaced transversely outward by an offset $+\delta$ from respective ports 270 and 274 with base displacements of $+W/4$. (The signs of offset $\delta$ refer to the direction of the x-axis.) In the present embodiment, the offset $\delta$ is given by Eqn. 2 hereinabove. In an alternative embodiment, $\delta$ may be optimized using simulations for a further improved CMRR.

MMI 252 (FIG. 2B) is similarly disposed on substrate 101 in the xz-plane, with guided waves propagating in the z-direction. MMI 252 comprises a multimode waveguide 280, which is bisected by the z-axis (forming its longitudinal axis), and has a width W B in the x-direction (transverse to the z-axis). MMI 252 has an input face 282 and an output face 284, with four input ports 286, 288, 290, and 292 on the input face and four output ports 294, 296, 298, and 300 on the output face. Input ports 286, 288, 290, and 292 and output ports 294, 296, 298, and 300 have been offset for optimal CMRR for MMI 252 as described hereinabove and as detailed further hereinbelow.

For a comparison to a general-interference 4×4 MMI with commonly used base displacements of $\pm W_B/8$ and $\pm 3W_B/8$ (i.e., not optimized for improved CMMR), input ports 302, 304, 306, and 308 and output ports 310, 312, 314, and 316 of such an MMI are drawn in FIG. 2B using dotted lines at the respective base displacements. Lines 318, 320, 322, and 324 define centerlines for respective pairs of ports (302, 310), (304, 312), (306, 314), and (308, 316), showing the base displacements: centerlines 320 and 322 are displaced by $\pm W_B/8$, while centerlines 318 and 324 are displaced by $\pm 3W_B/8$.

The displacements of input ports 286, 288, 290, and 292 are shown referenced to the base displacements of input ports 302, 304, 306, and 308. Similarly, the displacements of output ports 294, 296, 298, and 300 are shown referenced to the base displacements of output ports 310, 312, 314, and 316:

Input port 288 and output port 296 are displaced transversely outward by an offset $-\delta_1$ from respective ports 304 and 312 with base displacements of $-W_B/8$.

Input port 290 and output port 298 are displaced transversely outward by an offset $+\delta_1$ from respective ports 306 and 314 with base displacements of $+W_B/8$.

Input port 286 and output port 294 are displaced transversely outward by an offset $-\delta_2$ from respective ports 302 and 310 with base displacements of $-3W_B/8$.

Input port 292 and output port 300 are displaced transversely outward by an offset $+\delta_2$ from respective ports 308 and 316 with base displacements of $+3W_B/8$.

In the present embodiment, the offsets $\delta_1$ and $\delta_2$ are given by $\delta_1=\delta/2$ and $\delta_2=3\delta/2$, wherein $\delta$ is given by Eqn. 2 hereinabove. In an alternative embodiment, both $\delta_1$ and $\delta_2$ are optimized by simulations for further improvement of CMRR.

Figure 3:
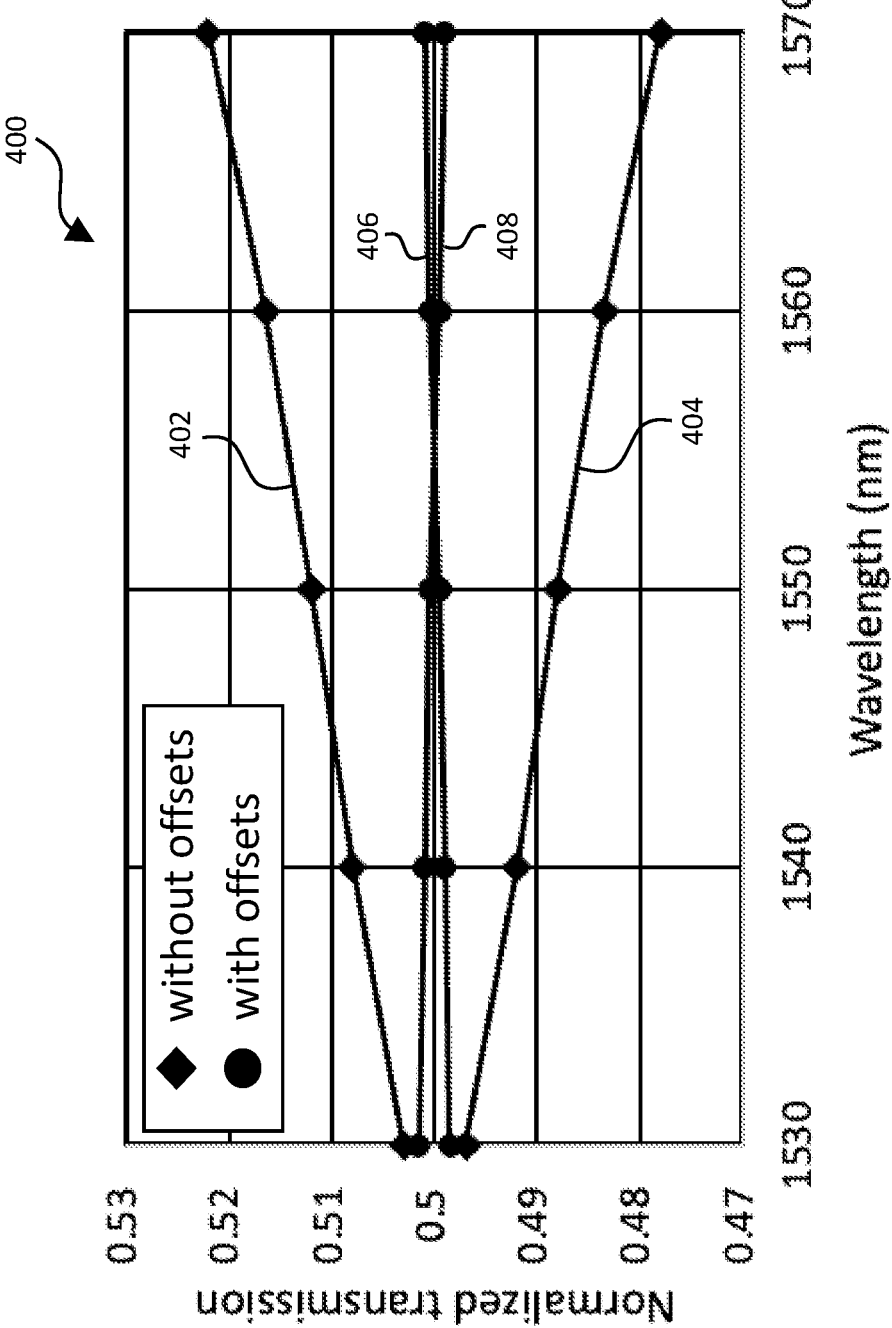
FIGS. 3-5 are plots that schematically illustrate performance characteristics of MMIs, such as the MMIs of FIGS. 2A and 2B, in accordance with an embodiment of the invention.
Figure 4:
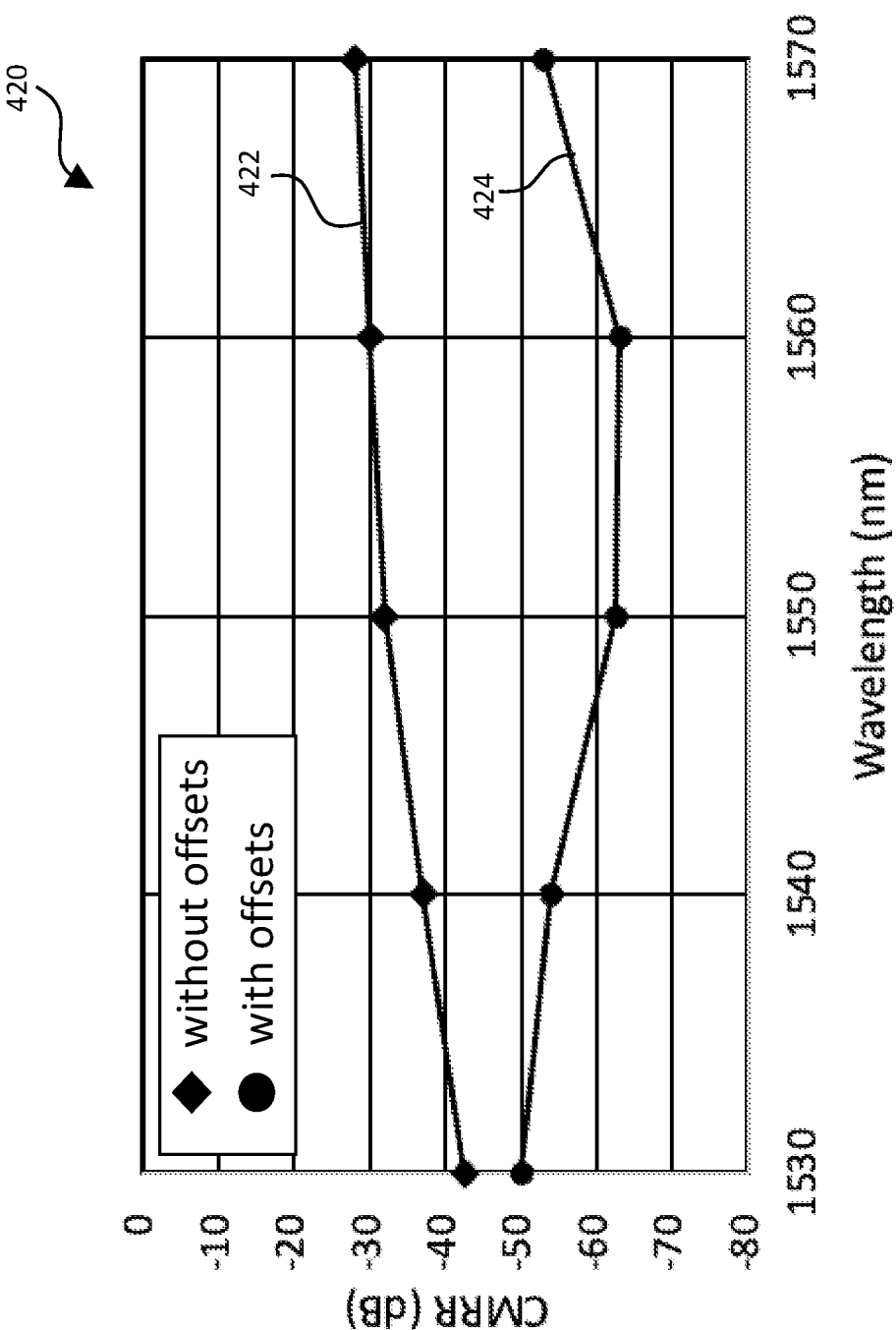
Figure 5:
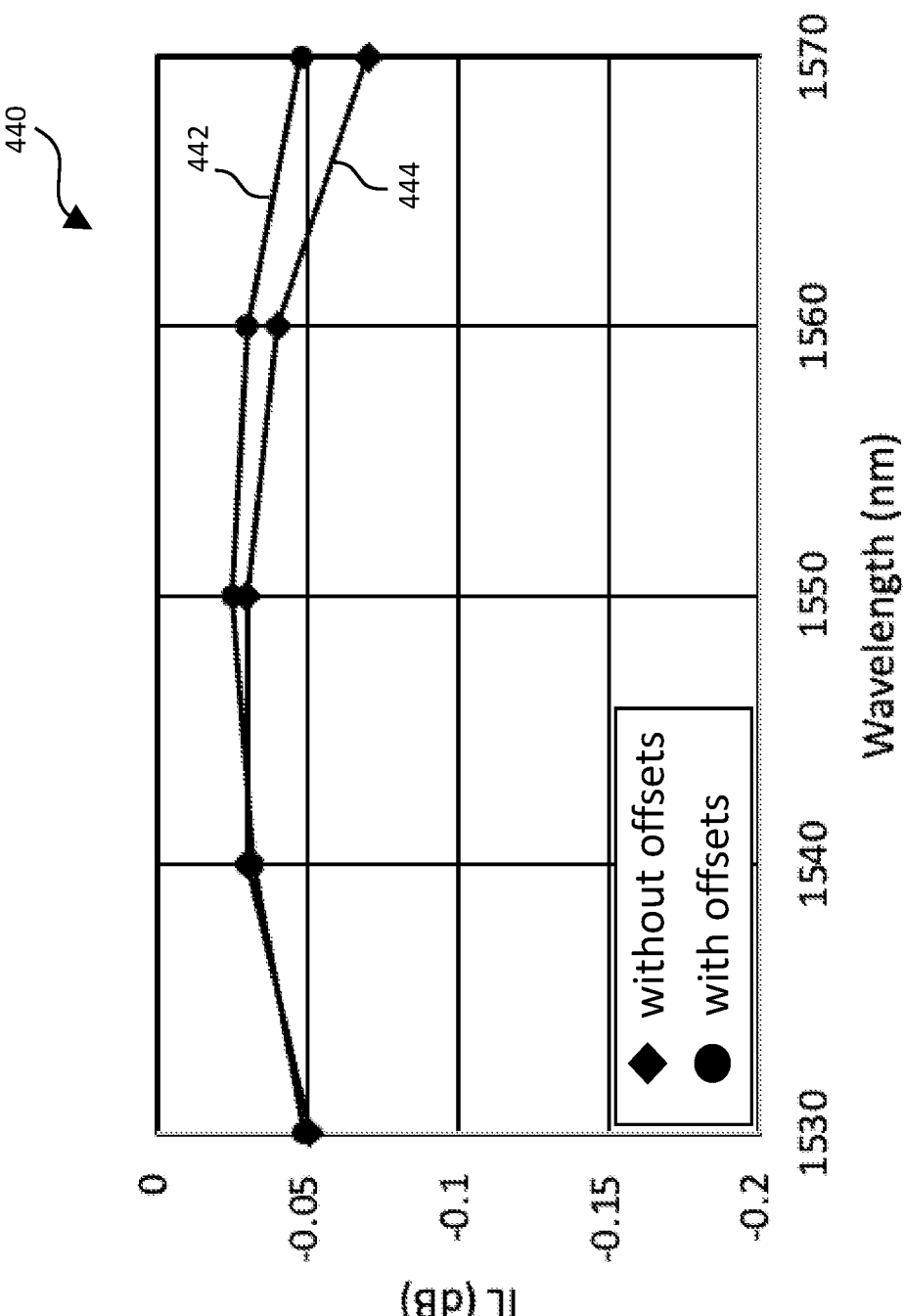

FIGS. 3-5 are plots that show the performance of a 2×2 MMI with and without port offset, in accordance with an embodiment of the invention. In other words, these plots compare the performance MMI 250 using ports 260, 262, 264 and 266 to the performance of the same MMI using ports 268, 270, 272 and 274.

A plot 400 in FIG. 3 shows normalized transmissions $T_1$ and $T_2$ to the respective output ports 1 and 2 of a 2×2 MMI with and without port offsets. Curves 402 and 404 illustrate the normalized transmissions T1 and T2 without port offsets through a spectral range from 1530 nm to 1570 nm, while curves 406 and 408 illustrate the normalized transmissions T1 and T2 with port offsets. The applied port offsets have been computed from Eqn. 2 and further optimized through simulations.

Curves 402 and 404 illustrate the divergence between the normalized transmissions to the two ports especially with increasing wavelengths, showing that at the wavelength of 1570 nm $T_1=0.522$ while $T_2=0.478$. Curves 406 and 408 illustrate well-balanced transmissions to the two output ports across the presented spectral range (difference less than 0.04).

A plot 420 in FIG. 4 shows the common-mode rejection ratio CMRR computed from the results of plot 400 (FIG. 3). A curve 422 illustrates the CMRR between the two outputs of the 2×2 MMI without port offsets, whereas a curve 424 illustrates the CMRR with port offsets applied. Similarly to plot 400, the advantage of port offsets in balancing the outputs between the two output ports, here shown in terms of CMRR, is evident: Without port offsets, CMMR is above −40 dB across most of the spectral range, whereas with port offsets CMMR is below −50 dB across the range.

In a plot 440 in FIG. 5, curves 442 and 444 illustrate the insertion loss IL for the 2×2 MMI without port offsets and with port offsets, respectively. The IL is low for both cases, with the IL for the MMI with port offsets being either equal to or lower than the IL for the MMI without port offset.

The embodiments described above are cited by way of example, and the presently described inventions are not limited to what has been particularly shown and described hereinabove. Rather, the scope of the presently described inventions includes both combinations and subcombinations of the various features described hereinabove, as well as variations and modifications thereof which would occur to persons skilled in the art upon reading the foregoing description and which are not disclosed in the prior art.

The invention claimed is:

1. An optical transceiver, comprising:
a substrate; and
optical circuitry disposed on the substrate and comprising:
a transmitter, comprising first waveguides and one or more modulators configured to generate an outgoing modulated optical beam at a free-space wavelength $\lambda_0$ for transmission over an optical communication link;
a receiver, comprising second waveguides and one or more detectors configured to receive and sense an incoming modulated optical beam at the free-space wavelength $\lambda_0$ from the optical communication link; and
at least one multi-mode interferometer (MMI), including:
a multi-mode waveguide comprising an input face and an output face, the input and output faces being bisected by a longitudinal axis, the multi-mode waveguide having a predefined width transverse to the longitudinal axis; and
ports, which are coupled to respective ones of the waveguides and are configured to launch one or more input beams through the input face and receive one or more output beams from the output face, and which comprise, on at least one of the faces, two or more ports at respective locations that are offset transversely outward from the longitudinal axis by at least $\lambda_0/300$ from respective base transverse displacements that are equal to integer fractions of the width.

2. The transceiver according to claim 1, wherein the substrate is formed of silicon (Si) or silicon-on-insulator (SOI).

3. The transceiver according to claim 1, wherein the first and second waveguides are formed of Si or silicon nitride (SiN).

4. The transceiver according to claim 1, wherein the two or more ports consist of two ports, wherein the base displacements relative to the longitudinal axis are ±1/4 of the width.

5. The transceiver according to claim 1, wherein the two or more ports consist of four ports, wherein the base displacements relative to the longitudinal axis are ±1/8 and ±3/8 of the width.

6. The transceiver according to claim 1, wherein the two or more ports are offset away from the longitudinal axis relative to the base displacements that are equal to integer fractions of the width.

7. The transceiver according to claim 1, wherein the two or more ports are offset from the base displacements by at least $\lambda_0/100$.

8. The transceiver according to claim 1, wherein the two or more ports are offset from the base displacements by at least 5 nm.

9. The transceiver according to claim 8, wherein the two or more ports are offset from the base displacements by at least 10 nm.

10. The transceiver according to claim 1, wherein the two or more ports comprise at least two input ports, which are offset transversely by at least $\lambda_0/300$ from the respective base displacements on the input face, and at least two output ports, which are offset transversely by at least $\lambda_0/300$ from the respective base displacements on the output face.

11. A method for optical communication, comprising:

providing optical circuitry disposed on a substrate and comprising a transmitter, comprising first waveguides and one or more modulators configured to generate an outgoing modulated optical beam at a free-space wavelength $\lambda_0$ for transmission over an optical communication link, and a receiver, comprising second waveguides and one or more detectors configured to receive and sense an incoming modulated optical beam at the free-space wavelength $\lambda_0$ from the optical communication link;

incorporating in the optical circuitry at least one multimode interferometer (MMI), which includes a multimode waveguide comprising an input face and an output face, the input and output faces being bisected by a longitudinal axis, the multi-mode waveguide having a predefined width transverse to the longitudinal axis, and which includes ports, which are coupled to respective ones of the waveguides and are configured to launch one or more input beams through the input face and receive one or more output beams from the output face, including two or more ports on at least one of the faces; and offsetting respective locations of the two or more ports transversely outward from the longitudinal axis by at least $\lambda_0/300$ from respective base transverse displacements that are equal to integer fractions of the width.

12. The method according to claim 11, wherein providing the optical circuitry comprises forming the substrate of silicon (Si) or silicon-on-insulator (SOI).

13. The method according to claim 11, wherein providing the optical circuitry comprises forming the first and second waveguides of Si or silicon nitride (SiN).

14. The method according to claim 11, wherein incorporating the at least one MMI comprises forming two ports on the at least one of the faces, and wherein the base displacements relative to the longitudinal axis are ±1/4 of the width.

15. The method according to claim 11, wherein incorporating the at least one MMI comprises forming four ports on the at least one of the faces, and wherein the base displacements relative to the longitudinal axis are ±1/8 and ±3/8 of the width.

16. The method according to claim 11, wherein offsetting the respective locations comprises displacing the two or more ports away from the longitudinal axis relative to the base displacements.

17. The method according to claim 11, wherein offsetting the respective locations comprises displacing the two or more ports from the base displacements by at least $\lambda_0/100$.

18. The method according to claim 11, wherein offsetting the respective locations comprises displacing the two or more ports from the base displacements by at least 5 nm.

19. The method according to claim 18, wherein offsetting the respective locations comprises displacing the two or more ports from the base displacements by at least 10 nm.

20. The method according to claim 11, wherein incorporating the at least one MMI comprises forming at least two input ports on the input face and at least two output ports on the output face, and wherein offsetting the respective locations comprises displacing the at least two input ports transversely by at least $\lambda_0/300$ from the respective base displacements on the input face, and displacing the at least two output ports transversely by at least $\lambda_0/300$ from the respective base displacements on the output face.

* * * * *